US012794582B2

(12) United States Patent
Liu

(10) Patent No.: US 12,794,582 B2
(45) Date of Patent: Nov. 10, 2026

(54) SERVICE SENDING AND RECEIVING METHODS, DEVICE, SYSTEM AND STORAGE MEDIUM

(71) Applicant: ZTE CORPORATION, Shenzhen (CN)

(72) Inventor: Feng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 279 days.

(21) Appl. No.: 18/673,227

(22) Filed: May 23, 2024

(65) Prior Publication Data

US 2024/0314079 A1 Sep. 19, 2024

Related U.S. Application Data

(62) Division of application No. 17/290,339, filed as application No. PCT/CN2019/115143 on Nov. 1, 2019, now Pat. No. 12,040,981.

(30) Foreign Application Priority Data

Nov. 2, 2018 (CN) ........................ 201811299296.6

(51) Int. Cl.
*H04J 3/07* (2006.01)
*H04L 1/00* (2006.01)
*H04L 47/24* (2022.01)

(52) U.S. Cl.
CPC .............. *H04J 3/07* (2013.01); *H04L 1/0079* (2013.01); *H04L 47/24* (2013.01)

(58) Field of Classification Search
None
See application file for complete search history.

(56) References Cited

U.S. PATENT DOCUMENTS

| | | | | |
|---|---|---|---|---|
| 2019/0281145 A1* | 9/2019 | Si | ............................ | H04L 69/02 |
| 2020/0220650 A1* | 7/2020 | Cheng | ...................... | H04L 41/34 |

FOREIGN PATENT DOCUMENTS

| | | | | |
|---|---|---|---|---|
| CN | 107786299 | A | | 3/2018 |
| CN | 107786320 | A | | 3/2018 |
| CN | 107888345 | A | | 4/2018 |
| CN | 107888516 | A | | 4/2018 |
| CN | 108092739 | | * | 5/2018 |
| CN | 108092739 | A | | 5/2018 |
| EP | 3306839 | A1 | | 4/2018 |
| EP | 3496344 | A1 | | 6/2019 |
| EP | 3522465 | A1 | | 8/2019 |

(Continued)

OTHER PUBLICATIONS

European Patent Office, The extended European search report issued Aug. 8, 2022 for application No. EP19880135.9.

(Continued)

*Primary Examiner* — Andre Tacdiran
(74) *Attorney, Agent, or Firm* — Li & Cai Intellectual Property (USA) Office

(57) ABSTRACT

The present application discloses a service sending method, receiving method, device, system, and storage medium. The service sending method includes: sending, by a sending end, a service flow, a target information block of the service flow carrying position information, and the position information being used for indicating a relative position of the target information block in the service flow.

9 Claims, 9 Drawing Sheets

(56) References Cited

FOREIGN PATENT DOCUMENTS

| | | | |
|---|---|---|---|
| EP | 3565163 | A1 | 11/2019 |
| WO | 2017201953 | A1 | 11/2017 |
| WO | 2018133402 | A1 | 7/2018 |

OTHER PUBLICATIONS

China Patent Office, First Office Action issued May 30, 2022 for application No. CN201811299296.6.
China Patent Office, Second Office Action issued Aug. 26, 2022 for application No. CN201811299296.6.
WIPO, International Search Report issued on Feb. 6, 2020.

* cited by examiner

SERVICE SENDING AND RECEIVING METHODS, DEVICE, SYSTEM AND STORAGE MEDIUM

CROSS-REFERENCE TO RELATED APPLICATIONS

The present application is a divisional application of U.S. patent application Ser. No. 17/290,339 filed on Apr. 30, 2021 as a National Stage of International Application No. PCT/CN2019/115143 filed on Nov. 1, 2019, which claims the priority from Chinese Patent Application No. 201811299296.6 filed with the Chinese Patent Office on Nov. 2, 2018, these applications are hereby incorporated herein by reference in their entireties.

TECHNICAL FIELD

Embodiments of the present disclosure relate to a service sending method and device, a service receiving method and device, a service transmission system, and a computer-readable storage medium.

BACKGROUND

With the vigorous development of Internet technology, the main content of information has changed from voice services to data services, and the communication network has changed from a Synchronous Digital Hierarchy (SDH) network adapted to the voice services to an Ethernet network. The Ethernet is an asynchronous network, which does not require a same clock frequency of devices in the network and allows a deviation within a range of −100 PPM to +100 PPM (1 PPM is one part per million) between the clock frequencies of the devices. For example, for the Ethernet with an interface of 1G, an allowable operating frequency of some equipment is: 0.9999 G bit/s, the deviation of which is-100 PPM of a standard frequency; and another allowable operating frequency of some equipment is: 1.0001 G bit/s, the deviation of which is +100 PPM of the standard frequency. In a case of data transmission on the Ethernet, data packets are not continuous and there is an interval, i.e., a frame gap, between the packets. The Ethernet standard stipulates that a reference length of the frame gap between packets is 12 bytes (and a length more than 8 bytes is allowed). In a case where a deviation exists between operating clock frequencies of Ethernet devices, a speed of a service flow can be adjusted by adjusting a size of a frame gap between packets, to ensure that the speed of the service flow matches a clock frequency of a network physical interface, and that the service flow will not be interrupted.

The flexible Ethernet (FlexE) technology combines technical characteristics of Ethernet and SDH networks. A physical interface of the network established by the flexible Ethernet technology still have the technical characteristics of Ethernet. When there is a deviation between clock frequencies of network devices, the frequency adaptation can be achieved by increasing or decreasing the number of IDLE blocks (i.e., idle information blocks) in a client service. However, the addition or deletion of IDLE block by the devices in the transmission network destroys original clock and phase information of the client service flow. As a result, only information content of the original client service can be restored at a destination point, but clock information cannot be restored.

SUMMARY

At least one embodiment of the present application provides a service sending method and device, a service receiving method and device, a service transmission system, and a computer-readable storage medium to realize the transmission of clock information of a service flow. At least one embodiment of the present application provides a service sending method, including: sending, by a sending end, a service flow, a target information block of the service flow carrying position information, and the position information being used for indicating a relative position of the target information block in the service flow.

At least one embodiment of the present application provides a service receiving method, including: receiving, by a receiving end, a service flow, and determining a relative position of a received target information block in the received service flow; and restoring the service flow according to the relative position and position information carried in the target information block.

At least one embodiment of the present application provides a service sending device, including a memory and a processor. The memory stores a program, and when the program is read and executed by the processor, the service sending method described in any embodiment is implemented.

At least one embodiment of the present application provides a computer-readable storage medium storing at least one program. The at least one program is executable by at least one processor to implement the service sending method described in any embodiment.

At least one embodiment of the present application provides a service receiving device, including a memory and a processor. The memory stores a program, and when the program is read and executed by the processor, the service receiving method described in any embodiment is implemented.

At least one embodiment of the present application provides a computer-readable storage medium storing at least one program. The at least one program is executable by at least one processor to implement the service receiving method described in any embodiment.

At least one embodiment of the present application provides a service transmission system, including the service sending device described in any embodiment and the service receiving device described in any embodiment.

DETAILED DESCRIPTION

The steps shown in the flowcharts of the drawings may be performed in a computer system such as a set of computer-executable instructions. In addition, although a logical sequence is shown in the flowcharts, in some cases, the steps shown or described may be performed in an order different from that described herein.

Figure 1:
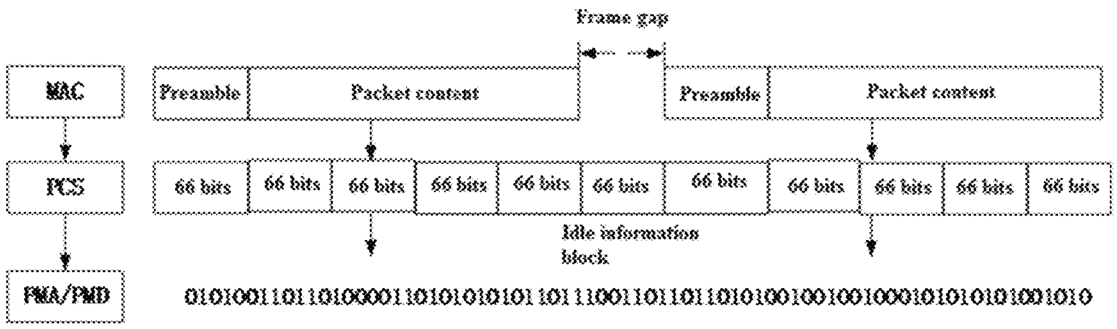
FIG. 1 is a schematic diagram of a packet processing process of an Ethernet.
Figure 2:
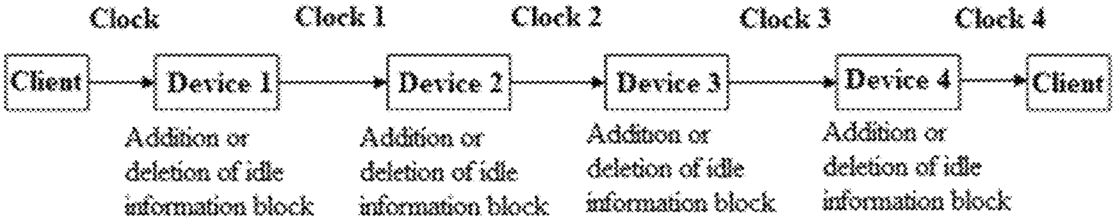
FIG. 2 is a schematic diagram of a service transmission in a network of Ethernet technology.
Figure 3:
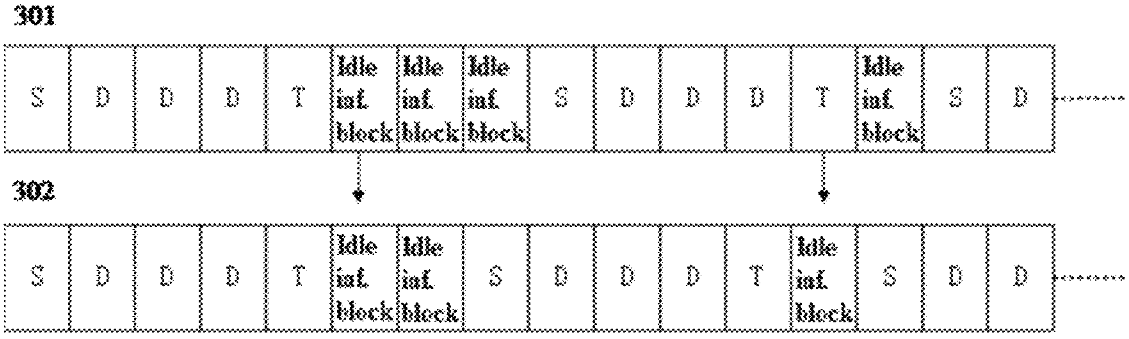
FIG. 3 is a schematic diagram of a process of deleting an IDLE block in a service flow.
Figure 4:
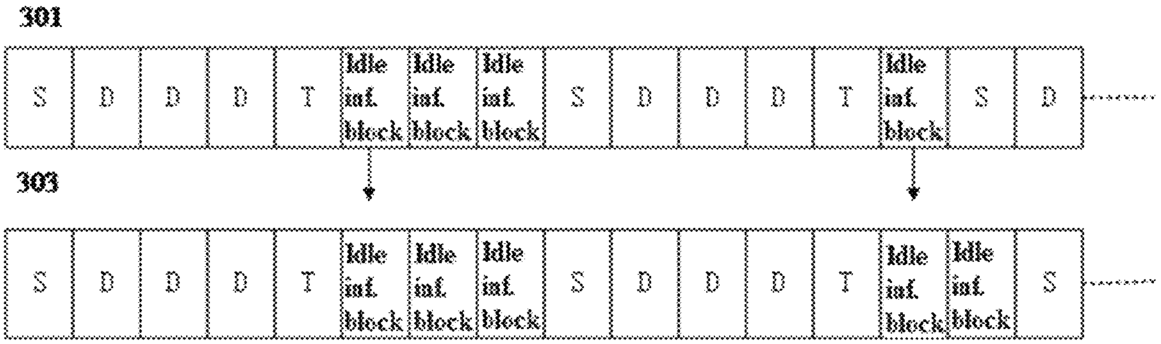
FIG. 4 is a schematic diagram of a process of adding an IDLE block in a service flow.

Although a synchronous network may be established through Ethernet technology, and all devices are synchronized to a same clock source, there is a difference between a clock frequency of a client service and that of the network, and there are also differences between clock frequencies of all client services. A frequency difference within a range of −100 PPM to +100 PPM of a standard frequency is qualified. For example, for the Ethernet with an interface of 1G, an operating frequency of the client service between 0.9999 G bit/s (i.e., −100 PPM of the standard frequency) and 1.0001 G bit/s (i.e., +100 PPM of the standard frequency) is qualified. Flexible Ethernet (FlexE) technology combines the technical characteristics of Ethernet, Optical Transport Network (OTN) and SDH network to expand the Ethernet technology, and bundles a plurality of Ethernet interfaces into a large physical pipeline to realize functions of large capacity, sub-pipeline and channelization, which can realize the requirements of low latency, large bandwidth and flexible bandwidth scheduling, with obvious technical advantages. A transmission network formed by devices adopting interfaces of FlexE technology is shown in FIGS. 1 and 2. A FlexE interface is used between two devices, and a service flow is from a media access control (MAC) layer to a physical coding sublayer (PCS) of a physical layer, and then to a physical medium dependent (PMD) sublayer/physical medium attachment (PMA) sublayer. A client service received from one direction inside a device is directly sent out in another direction crossing the one direction at the PCS layer. Because the clock frequencies of the receiving direction and the sending direction are inconsistent, a size of a frame gap between packets needs to be adjusted to adapt to the different clock frequencies of the network physical interfaces, to ensure that the client service will not be interrupted. For the MAC layer, and the PMD and PMA sublayers of the physical layer, for example, for a service of 10G, a service flow processed by the PCS layer is a 66-bit block, and the frame gap and idle time are indicated by IDLE blocks. Each IDLE block is equivalent to an idle time of 8 bytes. The device adjusts a rate of the service flow by adding or deleting the IDLE blocks in the service flow to adapt to changes of clock frequencies of device interfaces. In a service flow 301 shown in FIG. 3, a block S is the first block of a packet, a D block is a data block of the packet, a block T is the end block of the packet, and an IDLE block is an idle information block. There are three idle information blocks between the first packet and the second packet, and one idle information block between the second packet and the third packet. In a case that a sending service clock of the device is less than a receiving service clock, the rate of the service flow needs to be reduced, which can be achieved by deleting an appropriate number of IDLE blocks in the service flow. As shown in FIG. 3, there is a change from the number of idle information blocks in the service flow 301 to that in the service flow 302, and the number of idle information blocks between the first and second packets is changed from 3 to 2. In a case that the sending service clock of the device is greater than the receiving service clock, the rate of the service flow needs to be increased, which can be achieved by adding an appropriate number of IDLE blocks in the service flow. As shown in FIG. 4, there is a change from the number of idle information blocks in the service flow 301 to that in the service flow 303, and the number of idle information blocks between the second and third packets is changed from 1 to 2.

When transmitting client packet information, the Ethernet device, such as a 10G physical interface, first converts the packet into a 66-bit information block. Information blocks include two types: data blocks (i.e., D blocks, whose first two bits are "01") and control blocks (whose first two bits are "10"). Control blocks further include many types. The type of a control block is determined according to values of bits at positions 2-9 in the block, such as an O code block (i.e., a fault information block), an idle information block, an S block (i.e., a flag of the first block of a packet), a T block (i.e., a flag of the last block of a packet), etc. The header of the packet is converted into an S block, the content of the packet is converted into D blocks, the end of the packet is converted into a T block, and the frame gap part of the packet is converted into an idle information block (i.e., an IDLE block). Each IDLE block is equivalent to an idle time of 8 bytes (when the frame gap is less than a complete IDLE block, the frame gap is accumulated, and converted into an IDLE block after the accumulation reaches 8 bytes). The 66-bit information block is converted into a bit stream including 0 or 1 and sent out through the physical interface. In a case where the speed of the service flow needs to be adjusted because the clock frequencies of the network devices are inconsistent, the speed of the service flow can be adjusted by increasing or decreasing the number of IDLE blocks to satisfy the requirements of the device interface clock frequencies.

After the number of the idle information blocks of the service increases or decreases, the content of the packet is not affected; however, the rate of the service flow changes, and thus it is impossible to restore the clock information of the original client service flow. In the carry requirements of the 5G fronthaul service, client information is required to retain all the information characteristics of the original service flow when passing through the fronthaul network. In addition to ensuring that the information content is correct, it is also necessary to ensure the clock information to calculate the transmission delay time of the client information. The current network formed by Ethernet and FlexE technologies cannot completely retain all clients' clock information, which cannot satisfy the technical requirements of 5G fronthaul services.

The addition or deletion of idle information block leads to confusion in the positional relationship between the information blocks in the service flow, which in turn leads to the inability to correctly restore the original clock information of the client service flow at a receiving end. When position relationship information between the information blocks is carried in the information flow, the original client service flow can be completely restored at the receiving end, thereby restoring the client clock information.

Figure 5:
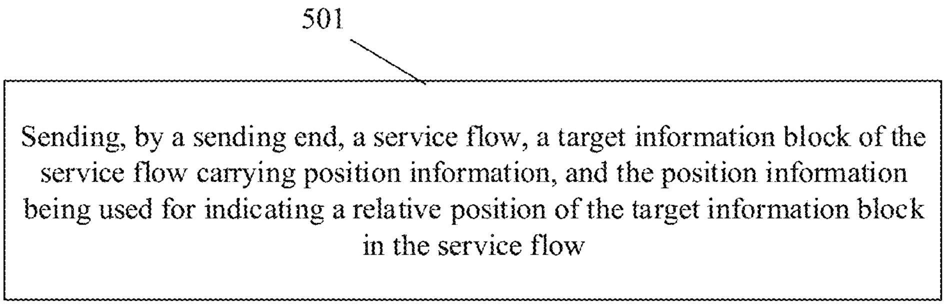
FIG. 5 is a flowchart of a service sending method provided by an embodiment of the present application.

As shown in FIG. 5, an embodiment of the present application provides a service sending method, which includes step 501.

In step 501, a service flow is sent by a sending end, a target information block of the service flow carries position information, and the position information is used for indicating a relative position of the target information block in the service flow.

The position information is a value of a sending counter of the sending end, and the sending counter is configured to count information blocks in the service flow. Alternatively, the position information is a sending time of the target information block.

Figure 6:
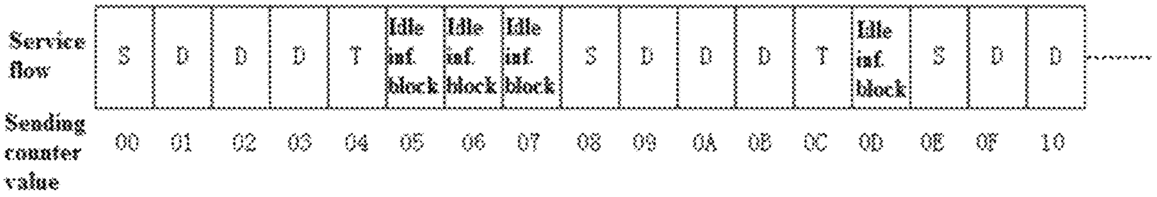
FIG. 6 is a schematic diagram of identification of a relative position of an information block in a service flow provided by an embodiment of the present application.

In an embodiment of the present application, when the sending end sends the service flow, a counter (e.g., a cyclic counter, counting from 0 to 0xffff in hexadecimal notation, which is only an example and can be another type of counter) is generated, to mark positional relationships between the information blocks. As shown in FIG. 6, from left to right, counter values corresponding to the information blocks are respectively 00, 01, 02, . . . , and relative positions of the information blocks in the service flow can be determined according to the counter values. The target information block of the service flow carries a counter value corresponding to the target information block, so that a relative position relationship of the information block can be determined at a receiving end. When the addition or deletion of IDLE block occur, the counter value carried by the target information block can be used to distinguish the addition of idle information block from the deletion of idle information block, and then a reverse deletion or addition operation may be performed to restore the original service flow. In FIG. 6, each time one information block is added, the counter value is increased by 1. It should be noted that FIG. 6 is only an example, and the counter may be an addition counter or a subtraction counter. A counting unit of the counter may be 1, or various values such as 2, 3, etc. The counter value may be a meaningless pure digital value; or may be a value representing a meaning of a certain parameter, such as a value representing a time parameter. In a case where a transmission rate of the service flow is fixed, a transmission time of the information block may also be used as its position information. An initial value of the counter may be set as needed.

The number of target information blocks carrying position information in the service flow may be set as needed. For example, each packet has a target information block, or a plurality of packets have one target information block, and so on.

The target information block includes at least one of an S block, a T block, an O code block, or a custom information block. In the same service flow, one of these information blocks may be used to carry position information, or multiple types of these information blocks may also be used to carry position information. Partial bytes of the S block, T block, O code block or custom information block may be used to carry position information.

When the target information block is the S block or the T block, before the sending end sends the service flow, the method further includes: replacing partial byte content of the S block or T block in the service flow with the position information.

Figure 7:
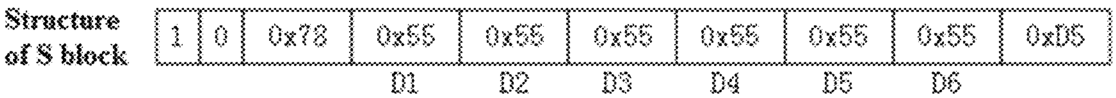
FIG. 7 is a structural schematic diagram of an S block in the Ethernet standard.
Figure 8:
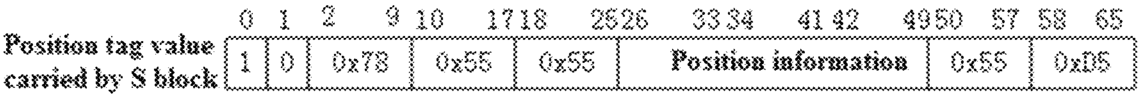
FIG. 8 is a schematic diagram of an S block carrying position information provided by an embodiment of the present application.

In a client information block flow, a client packet is indivisible continuous information blocks and composed of one S block, several D blocks, and one T block. An idle information block can only be located between two packets, i.e., after a previous T block and before a next S block. The D block is a client valid data, and the T block is the last block of the packet. The content of the D block is uncertain, and some of contents of different types of T blocks are fixed. The S block in the packet is used to indicate a length of the packet, and its content is a constant fixed value, as shown in FIG. 7. Since the content of the S block is a constant value, some bytes in the S block may be allocated to carry position information. As shown in FIG. 8, in an embodiment of the present application, 3 bytes in the S block are used to carry the position information. It should be noted that this is only an example, and more or fewer bytes may be used to carry position information as needed, or other bytes in the S block may be used to carry position information. Position information may be carried in each S block or some of the S blocks in the service flow.

Figure 9:
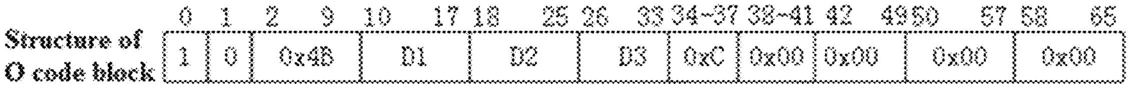
FIG. 9 is a structural schematic diagram of an O code block in the Ethernet standard.
Figure 10:
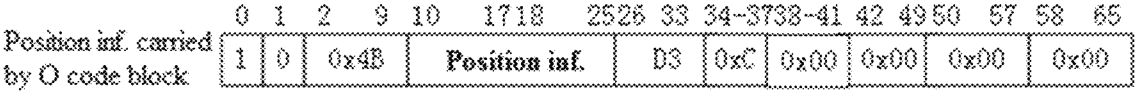
FIG. 10 is a schematic diagram of an O code block carrying position information provided by an embodiment of the present application.

In addition to carrying the position information in the S block, the position information may also be carried by using an O code block or a custom information block. An O code format defined in the Ethernet standard is shown in FIG. 9, in which the 66 bits of the O code block start with bits "10", and the first byte thereafter is 0x4B indicating an O code block. Bit positions 34-37 indicate a type of the O code block. Currently, four types of O code blocks are defined and include 0x0, 0x1, 0x5, and 0xf. Bit positions 38-65 are all 0, and bits 10-33 are carried information content. A new O code block type may be defined, such as 0xc (which is only an example, and other values may be used as needed), to indicate that the O code block carries position information. As shown in FIG. 10, bits 10-25 are used to carry position information. It should be noted that FIG. 10 is only an example, and other bits may be used to carry position information as needed.

Figure 11:
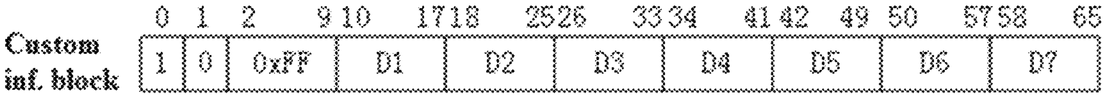
FIG. 11 is a schematic diagram of a custom information block provided by an embodiment of the present application.
Figure 12:
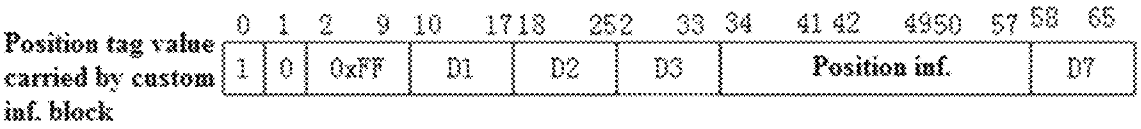
FIG. 12 is a schematic diagram of a custom information block carrying position information provided by an embodiment of the present application.

In other embodiments, a custom information block may also be used to carry a value of a position counter, as long as it conforms to relevant specifications, such as the Ethernet specifications. As shown in FIG. 11, it is a custom information block starting with bits "10", and the following byte is 0xff indicating that it is a custom information block for carrying position information. A custom information block carrying position information is shown in FIG. 12, in which bits 34-57 are used to carry the position information. It should be noted that this is only an example, and other bits may be used to carry position information.

Figure 13:
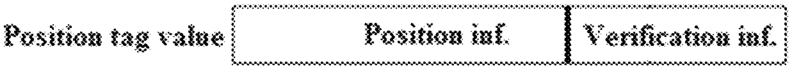
FIG. 13 is a schematic diagram of a position tag value provided by an embodiment of the present application.

In the case of using the O code block or custom information block to carry the position information, at the sending end, the idle information block in the service flow is replaced with the O code block (or the custom information block) carrying the position information, and the position information is brought to the receiving end. At the receiving end, the O code block (or custom information block) carrying the position information is restored to an idle information block, and then an idle information block is added or deleted in a reverse manner, so as to restore original client information flow blocks. Of course, it is also possible to directly add and/or delete idle information blocks (including the O code blocks and custom information blocks) in the reverse manner; and after the addition and deletion, if there are also O code blocks and custom information blocks carrying position information in the service flow, replace them with idle information blocks. In an embodiment, the target information block further carries verification information generated according to the position information, and the verification information is used to verify whether the position information is valid. For example, one byte in the target information block is used to carry the verification information. As shown in FIG. 13, in order to prevent errors in the transmission process from causing errors in the position information and error recovered clocks, the verification information (or a verification value) of the position information may be added to form a position tag value together with the position information. The verification information is calculated from the position information through a preset check algorithm. A cyclic redundancy check (CRC) algorithm or other check algorithms such as a parity check algorithm may be used to calculate the verification information. At the receiving end, after obtaining the position information, the same check algorithm may be used to calculate a verification-check value. The verification-check value calculated by the receiving end is compared with the carried verification information, so as to determine whether the carried position information is correct. Only when the carried position information is correct, the position information is used. After extracting the position information and the verification information, the receiving end restores the target information block to an original information block that does not carry the position information and the verification information. For example, when an S block is used to carry the position information and the verification information, the receiving end restores the content of bytes 0x55 in a corresponding position in the S block, to restore an original data byte structure of the S block.

Figure 14A:
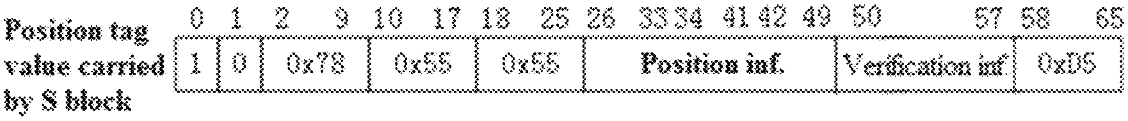
FIG. 14*a* is a schematic diagram of an S block carrying a position tag value provided by an embodiment of the present application.

FIG. 14*a* is a schematic diagram of an S block carrying a position tag value. As shown in FIG. 14*a*, bits 26-49 of the S block are used to carry the position information, and bits 50-57 are used to carry the verification information. It should be noted that this is only an example, other bits may be used to carry the position information and verification information as needed, and locations of the position information and verification information may also be interchanged.

Figure 14B:
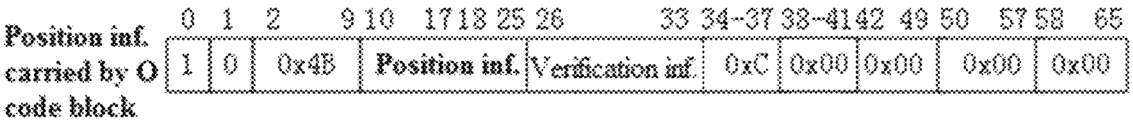
FIG. 14*b* is a schematic diagram of an O code block carrying a position tag value provided by an embodiment of the present application.

FIG. 14*b* is a schematic diagram of an O code block carrying a position tag value. As shown in FIG. 14*b*, bits 10-25 of the O code block are used to carry the position information, and bits 26-33 are used to carry the verification information. It should be noted that this is only an example, other bits may be used to carry the position information and verification information as needed, and locations of the position information and verification information may also be interchanged.

Figure 14C:
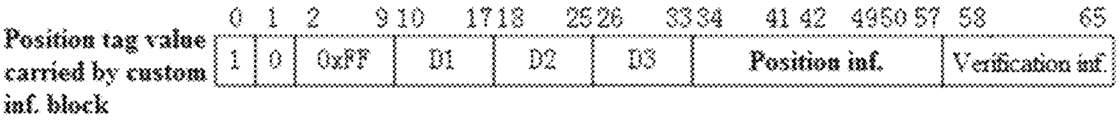
FIG. 14*c* is a schematic diagram of a custom information block carrying a position tag value provided by an embodiment of the present application.

FIG. 14*c* is a schematic diagram of a custom information block carrying a position tag value. As shown in FIG. 14*c*, bits 34-57 of the custom information block are used to carry the position information, and bits 58-65 are used to carry the verification information. It should be noted that this is only an example, other bits may be used to carry the position information and verification information as needed, and locations of the position information and verification information may also be interchanged.

Figure 15:
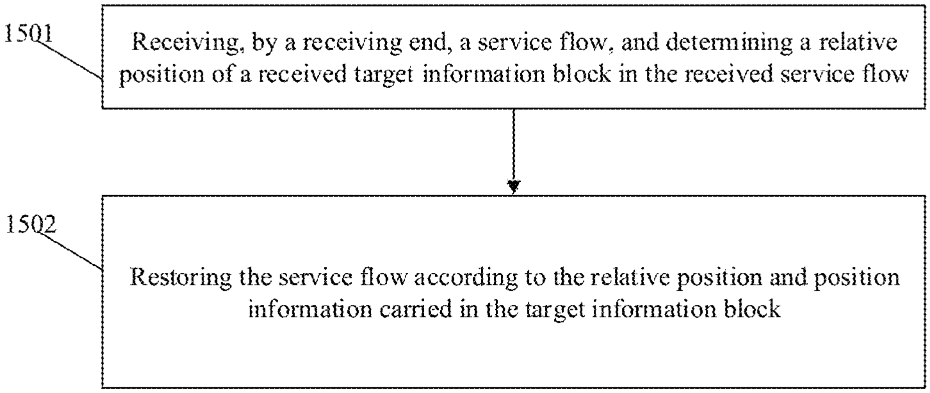
FIG. 15 is a flowchart of a service receiving method provided by an embodiment of the present application.

As shown in FIG. 15, an embodiment of the present application provides a service receiving method, including step 1501 and step 1502.

In step 1501, a service flow is received by a receiving end, and a relative position of a received target information block in the received service flow is determined.

In step 1502, the service flow is restored according to the relative position and position information carried in the target information block. Exemplarily, the service flow is restored to an original service flow of a sending end.

In an embodiment, the target information block includes at least one of an S block, a T block, an O code block, or a custom information block. It should be noted that this is only an example, and other information blocks may also be used to carry the position information as needed.

Figure 16:
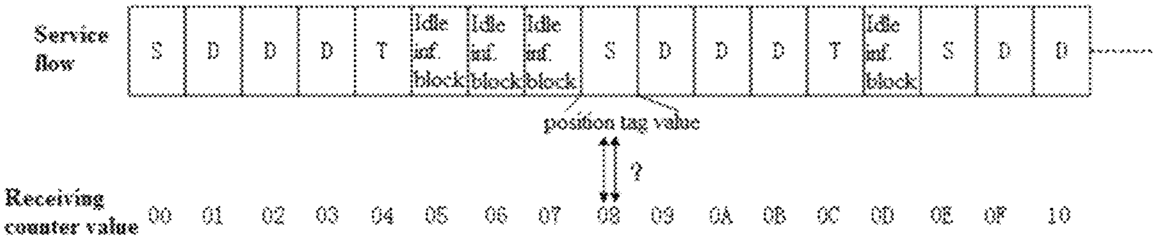
FIG. 16 is a schematic diagram of receiving counting of a receiving end provided by an embodiment of the present application.

In an embodiment, the step 1501 of determining the relative position of the received target information block in the received service flow includes: counting, by the receiving end, information blocks in the received service flow, by using a receiving counter; and determining the relative position of the received target information block in the received service flow, according to a value of the receiving counter. As shown in FIG. 16, the receiving counter counts when an information block is received, and a relative position of the information block may be determined according to a count value of the receiving counter. In FIG. 16, each time one information block is received, the receiving counter is incremented by 1. It should be noted that FIG. 16 is only an example. The receiving counter may be an addition counter or a subtraction counter. A counting unit of the counter may be 1, or various values such as 2, 3, etc. The counter value may be a meaningless pure digital value; or may be a value representing a meaning of a certain parameter, such as a value representing a time parameter. The receiving counter and the sending counter may both be addition counters or both subtraction counters. Of course, one of them may also be an addition counter and the other one may be a subtraction counter. The counting units of the sending and receiving ends may be the same or different. Of course, when the service flow is subsequently restored, calculations need to be performed separately according to the counters of the sending and receiving ends. In an embodiment, a counting mode of the sending counter of the sending end is identical to that of the receiving counter of the receiving end (i.e., the counting units are the same and in the same direction (i.e., both the sending and receiving counters are adding counters, or are subtracting counters)).

Of course, when a transmission rate of the service flow is fixed, relative positions of the service flow may also be determined according to receiving times; that is, a time when an information block is received is recorded, and then a relative position of the received information block in the received service flow can be determined.

In an embodiment, restoring the service flow according to the relative position and the position information carried in the target information block includes: determining a difference between the relative position of the target information block in the received service flow and a relative position of the target information block in a sent service flow, according to the relative position and the position information carried in the target information block, and restoring the service flow according to the difference.

When there is a difference between the relative position of the target information block in the received service flow and that in the sent service flow, it means that the addition or deletion of idle information block occurs during the transmission process, and several information blocks have been added or deleted. The receiving end performs reverse addition or deletion; that is, the same number of idle information blocks are deleted or added before the target information block, so that the relative position of the target information block at the receiving end is identical to that at the sending end. In an embodiment, when there is no idle information block before the target information block or the number of idle information blocks is relatively small, the number of idle information blocks deleted this time is recorded. When idle information blocks are subsequently received, the idle information blocks are continuously deleted until the same number of idle information blocks are deleted.

In an embodiment, when the difference indicates that an idle information block is added during the transmission process, the idle information block is deleted from the received service flow; and when the difference indicates that an idle information block is deleted during the transmission process, an idle information block is added to the received service flow.

Taking an embodiment using a counter as an example, the description is as follows. When an addition counter is used and a value of the receiving counter corresponding to the target information block is greater than position information extracted from the target information block, or when a subtraction counter is used and a value of the receiving counter corresponding to the target information block is less than position information extracted from the target information block, an idle information block is deleted from the service flow. When an addition counter is used and a value of the receiving counter corresponding to the target information block is less than position information extracted from the target information block, or when a subtraction counter is used and a value of the receiving counter corresponding to the target information block is greater than position information extracted from the target information block, an idle information block is added to the service flow.

The quantity of IDLE blocks added or deleted is equal to the quantity of idle information blocks corresponding to the difference. For example, that the counting unit is 1 and the difference is 1 indicates one idle information block.

Of course, when the two are the same (i.e., the difference is 0), there is no need to add or delete information blocks.

Since the service flow may be interrupted, in an embodiment, when the difference is within a preset range, the reverse addition and deletion of idle information block is performed in the received service flow according to the difference. The preset range may be set as needed, for example, an absolute value of the difference is less than or equal to 100. It should be noted that 100 is only an example, and the preset range may be set as needed. When the difference is beyond the preset range, a value of the position information carried in the target information block is assigned to the receiving counter as a receiving counter value corresponding to the target information block. When the difference is relatively large (i.e., beyond the preset range), it can be considered that the service flow has been interrupted. In this case, the receiving counter and the sending counter are resynchronized, to enable the receiving counter of the receiving end to operate again on the basis of a new count value.

There may be multiple methods for determining the difference between the relative position of the target information block in the received service flow and that in the sent service flow. In an embodiment, determining the difference between the relative position of the target information block in the received service flow and that in the sent service flow includes: using, by the receiving end, the position information carried in the target information block received for a first time as an initial value of the receiving counter of the receiving end, and obtaining a difference between a receiving counter value corresponding to the received target information block and the position information carried in the target information block, as the difference between the relative position of the target information block in the received service flow and the relative position of the target information block in the sent service flow. That is, after the receiving counter of the receiving end and the sending counter of the sending end are synchronized, a difference between the receiving counter value corresponding to the target information block and the position information carried in the target information block is the difference in relative position.

In another embodiment, the sending end may mark an information block as a starting information block for counting; after receiving the starting information block, the receiving end starts counting (i.e., a starting value is consistent with that of the sending counter) to realize the synchronization between the sending end and the receiving end, and thus, the difference between the receiving counter value corresponding to the target information block and the position information carried in the target information block is the difference in relative position.

It should be noted that synchronization may not be performed. For example, the initial value of the receiving counter of the receiving end is not set to the position information carried in the target information block received for the first time, and the initial value of the receiving counter may be set arbitrarily. In this case, when calculating the difference in relative position, it is necessary to use a counter value corresponding to an adjacent target information block. For example, a counter value carried by a first target information block is M1, a counter value carried by a second target information block is M2, a receiving counter value corresponding to the first target information block is N1, a receiving counter value corresponding to the second target information block is N2, and then the difference in relative position is: $N2-N1-(M2-M1)$.

In an embodiment, restoring the service flow according to the relative position and the position information carried in the target information block includes: in a case where the target information block is an O code block or a custom information block, restoring the target information block to an idle information block. Since the sending end replaces an idle information block with the O code block or custom information block, the idle information block is restored at the receiving end.

In an embodiment, restoring the service flow according to the relative position and the position information carried in the target information block includes: in a case where the target information block is an S block or a T block, restoring the target information block to an original S block or T block. The original S block or T block is the S block and T block in which no position information (or, position information and verification information) is carried.

In an embodiment, before restoring the service flow according to the relative position and the position information carried in the target information block, the method further includes: calculating a verification-check value according to the position information carried in the target information block; determining that the position information carried in the target information block is valid, in response to the verification-check value being identical to verification information carried in the target information block; and discarding the position information carried in the target information block, in response to the verification-check value being different from the verification information carried in the target information block. The check algorithm used by the receiving end to calculate the verification-check value is consistent with that of the sending end. The check algorithm may be, for example, a CRC algorithm, which is not limited in this application and can be set as needed.

The present application will be further described through an embodiment below.

Figure 17:
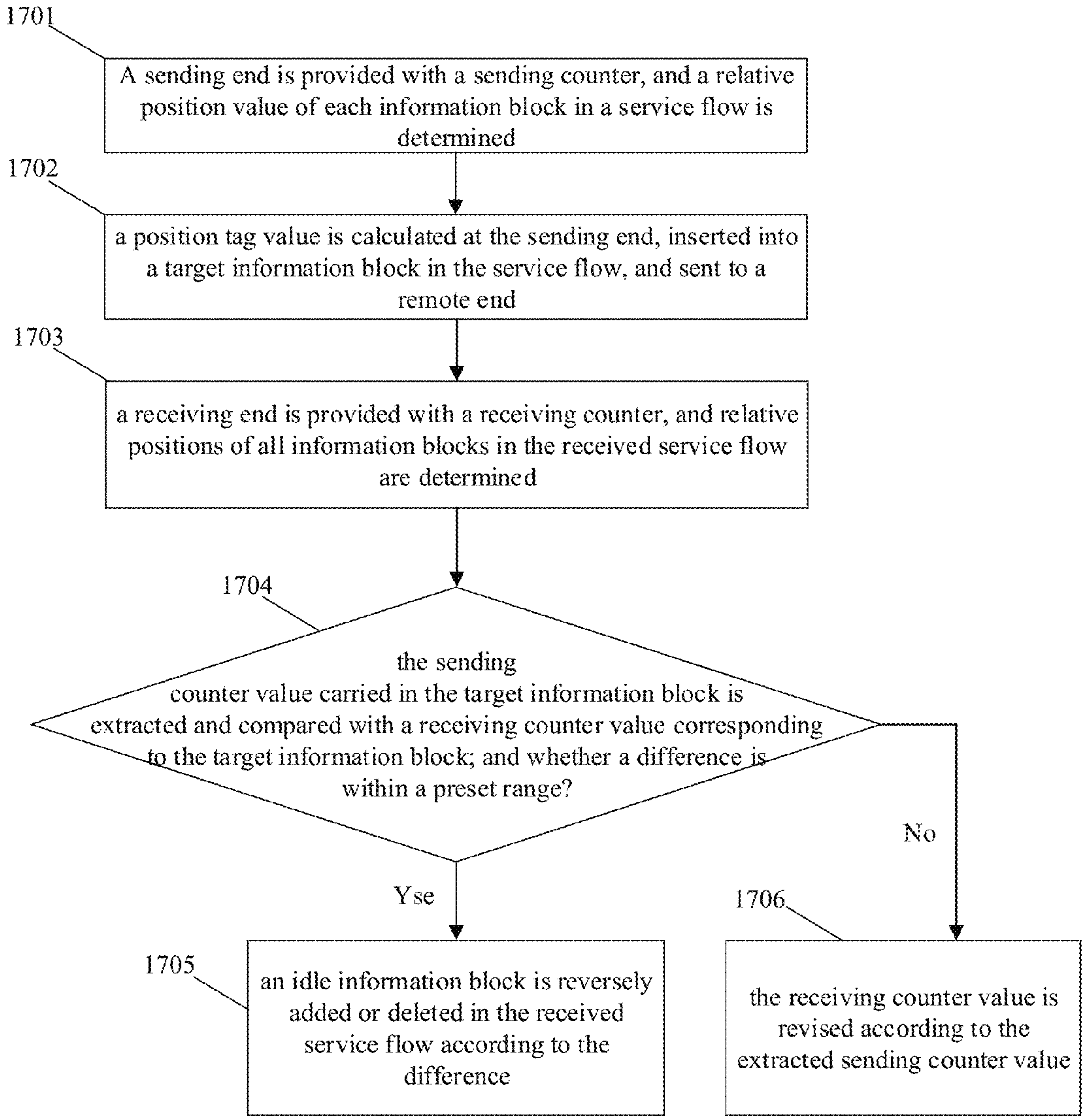
FIG. 17 is a flowchart of service sending and receiving provided by an embodiment of the present application.

As shown in FIG. 17, an embodiment of the present application provides a service sending and receiving method, including step 1701 to step 1706.

In step 1701, a sending end is provided with a sending counter, and a relative position value of each information block in a service flow is determined.

In step 1702, a position tag value is calculated at the sending end, inserted into a target information block in the service flow, and sent to a remote end.

The position tag value includes a sending counter value and a verification value calculated through a certain check algorithm according to the sending counter value.

In step 1703, a receiving end is provided with a receiving counter, and relative positions of all information blocks in the received service flow are determined.

In step 1704, the sending counter value carried in the target information block in the received service flow is extracted and compared with a receiving counter value corresponding to the target information block; in a case where a difference between the sending counter value carried in the target information block in the received service flow and the receiving counter value corresponding to the target information block is within a preset range, step 1705 is executed; and in a case where the difference between the sending counter value carried in the target information block in the received service flow and the receiving counter value corresponding to the target information block is not within the preset range, step 1706 is executed.

Before the comparison, the method further includes: calculating a verification-check value according to the sending counter value carried in the target information block. The carried verification value is compared with the calculated verification-check value, in a case where the carried verification value is the same as the calculated verification-check value, the sending counter value carried in the target information block is valid; and in a case where the carried verification value is not the same as the calculated verification-check value, the carried sending counter value is discarded.

In step 1705, an idle information block is reversely added or deleted in the received service flow, according to the difference between the sending counter value carried in the target information block in the received service flow and the receiving counter value corresponding to the target information block; and the process ends.

In an embodiment, when an addition counter is used and the receiving counter value corresponding to the target information block is greater than position information extracted from the target information block, or when a subtraction counter is used and the receiving counter value corresponding to the target information block is less than position information extracted from the target information block, an idle information block is deleted from the service flow. When an addition counter is used and the receiving counter value corresponding to the target information block is less than position information extracted from the target information block, or when a subtraction counter is used and the receiving counter value corresponding to the target information block is greater than position information extracted from the target information block, an idle information block is added to the service flow.

The quantity of IDLE blocks added or deleted is equal to the quantity of idle information blocks corresponding to the difference.

In step 1706, the receiving counter value is revised according to the extracted sending counter value, that is, the sending counter value extracted from the target information block is used as the receiving counter value corresponding to the target information block. In this case, no idle information block is added or deleted, and the process ends.

Figure 18:
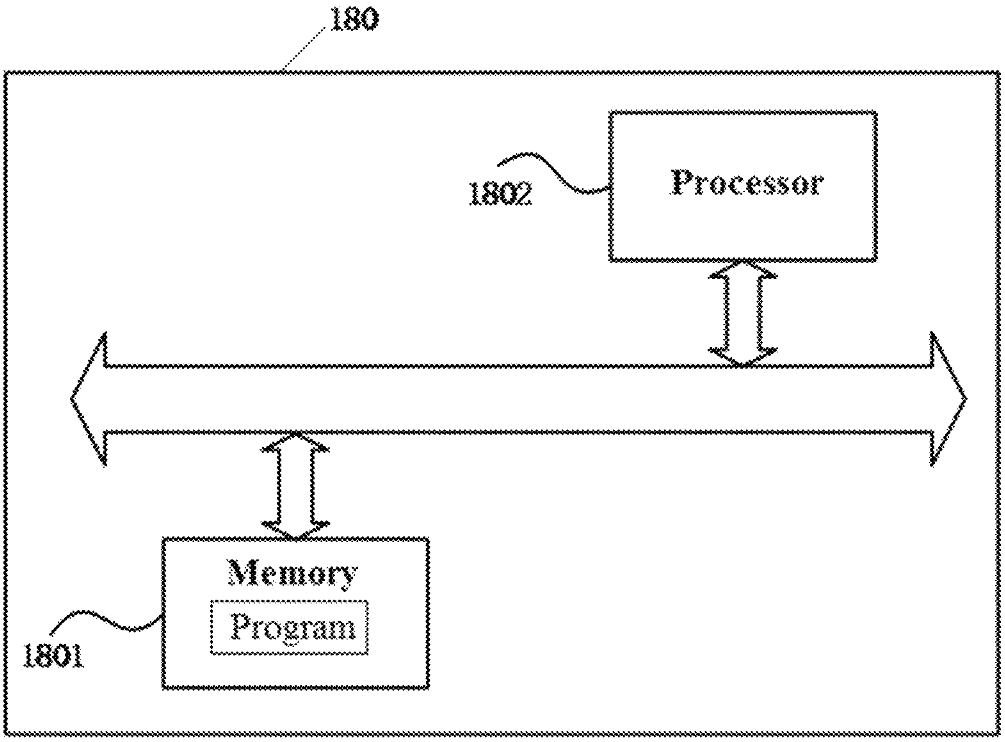
FIG. 18 is a block diagram of a service sending device provided by an embodiment of the present application.

As shown in FIG. 18, an embodiment of the present application provides a service sending device 180, which includes a memory 1801 and a processor 1802. The memory 1801 stores a program, and when the program is read and executed by the processor 1802, the service sending method described in any one of the embodiments is implemented.

Figure 19:
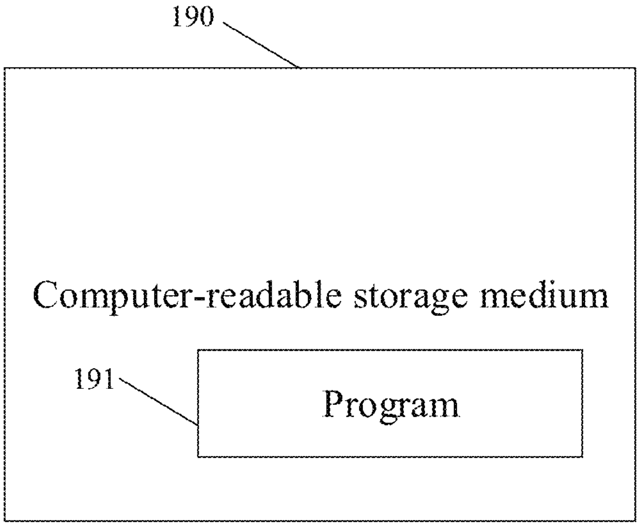
FIG. 19 is a block diagram of a computer-readable storage medium provided by an embodiment of the present application.

As shown in FIG. 19, an embodiment of the present application provides a computer-readable storage medium 190. The computer-readable storage medium 190 stores at least one program 191, and the at least one program 191 can be processed by at least one processor, to implement the service sending method described in any one of the embodiments.

Figure 20:
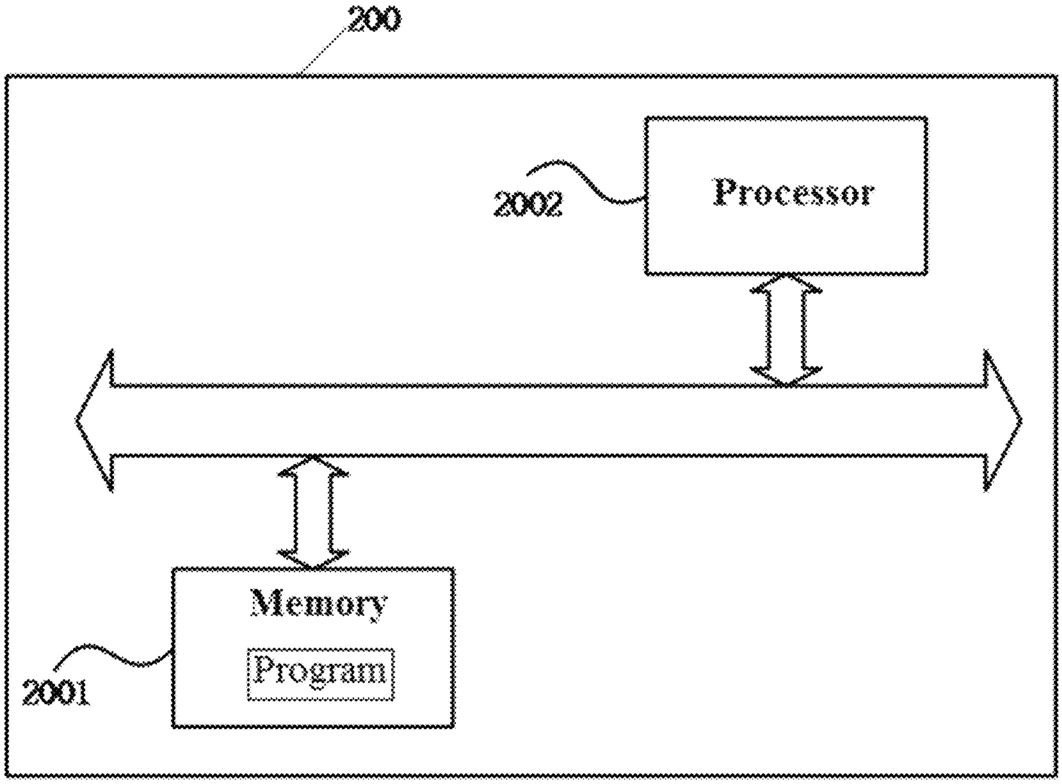
FIG. 20 is a block diagram of a service receiving device provided by an embodiment of the present application.

As shown in FIG. 20, an embodiment of the present application provides a service receiving device 200, which includes a memory 2001 and a processor 2002. The memory 2001 stores a program, and when the program is read and executed by the processor 2002, the service receiving method described in any one of the embodiments is implemented.

Figure 21:
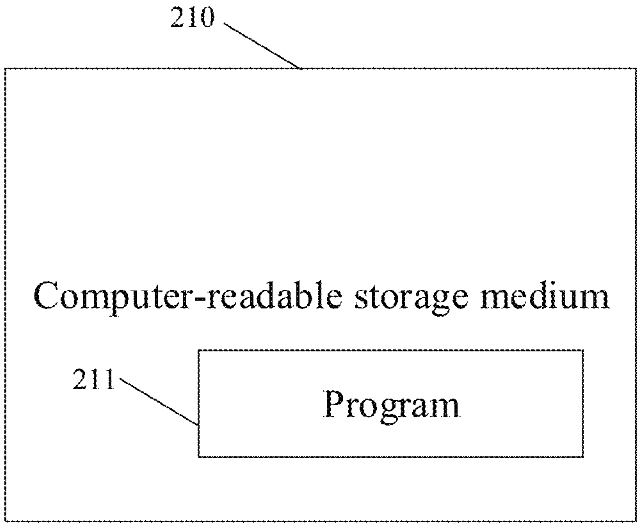
FIG. 21 is a block diagram of a computer-readable storage medium provided by an embodiment of the present application.

As shown in FIG. 21, an embodiment of the present application provides a computer-readable storage medium 210. The computer-readable storage medium 210 stores at least one program 211, and the at least one program 211 can be executed by at least one processor, to implement the service receiving method described in any one of the embodiments.

Figure 22:
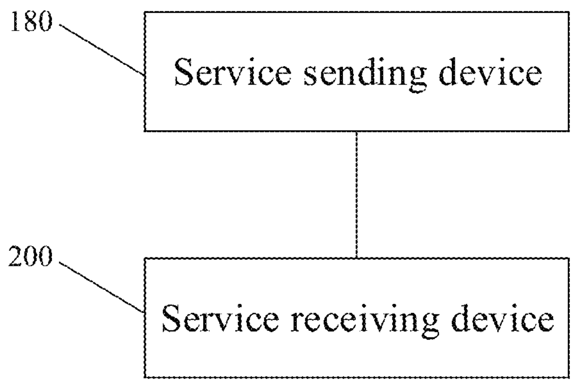
FIG. 22 is a block diagram of a service transmission system provided by an embodiment of the present application.

As shown in FIG. 22, an embodiment of the present application provides a service transmission system, which includes the above-mentioned service sending device 180 and service receiving device 200.

Figure 23:
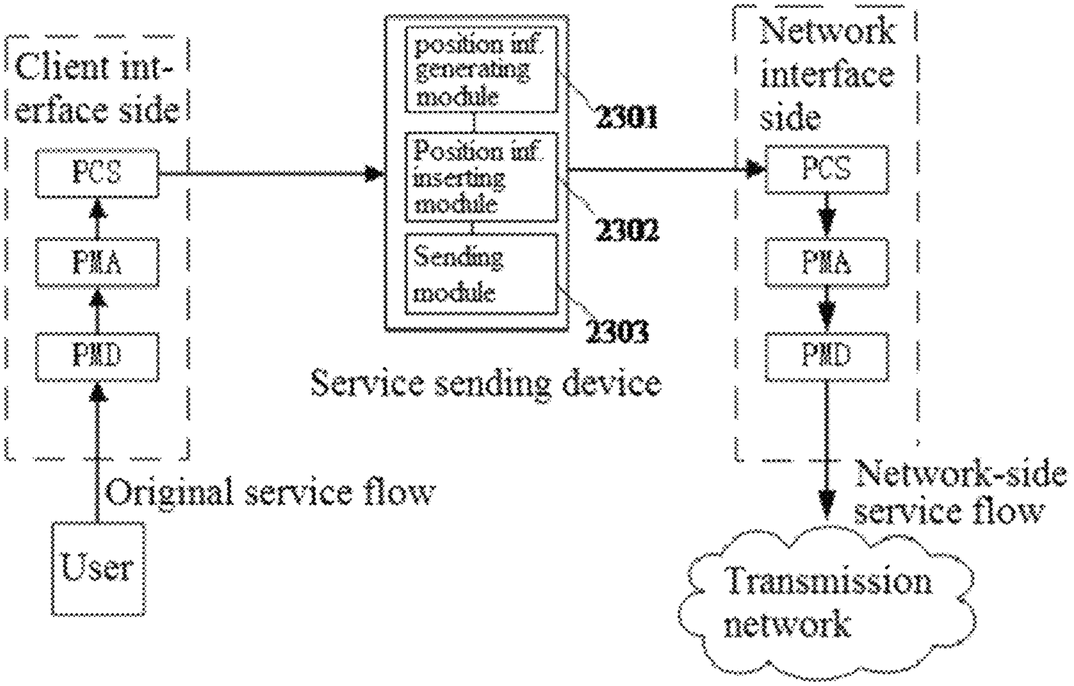
FIG. 23 is a block diagram of a service sending device provided by another embodiment of the present application.

As shown in FIG. 23, at a sending end, a service flow from a user is received through a PMD sublayer, a PMA sublayer and a PCS on a client interface side, position information is inserted into the service flow, and the service flow is sent out through the PCS, PMA and PMD on a network interface side. The service sending device includes: a position information generating module 2301, a position information inserting module 2302, and a sending module 2303.

The position information generating module 2301 is configured to determine a relative position of an information block in the service flow, to generate the position information.

The position information inserting module 2302 is configured to insert position information of a target information block into the target information block.

The sending module 2303 is configured to send the service flow.

Figure 24:
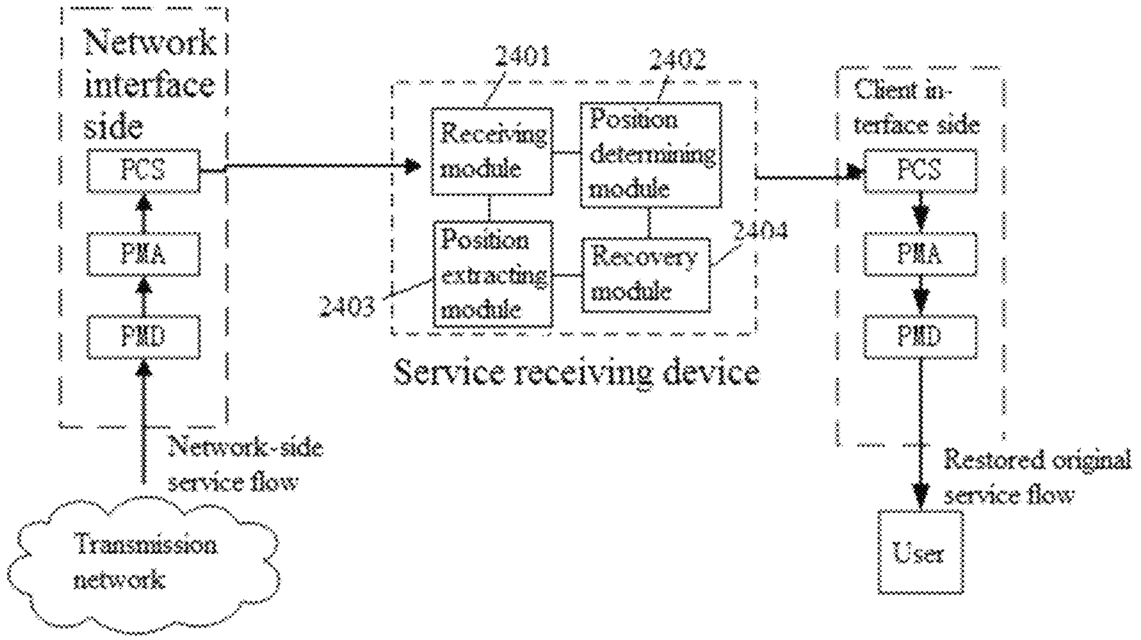
FIG. 24 is a block diagram of a service receiving device provided by another embodiment of the present application.

As shown in FIG. 24, the network-side service flow is received through the PMD, PMA and PCS on the network interface side, the relative position of the received target information block in the received service flow is determined, and after the service flow is restored according to the relative position and the position information carried in the target information block, the original service flow is output to the user through the PMD, PMA and PCS of the client interface.

As shown in FIG. 24, the service receiving device includes a receiving module 2401, a position determining module 2402, a position extracting module 2403, and a service flow recovery module 2404.

The receiving module 2401 is configured to receive a service flow.

The position determining module 2402 is configured to determine a relative position of a received target information block in the received service flow.

The position extracting module 2403 is configured to extract position information carried in the target information block.

The service flow recovery module 2404 is configured to restore the service flow according to the relative position and the position information carried in the target information block.

In an embodiment, the position determining module 2402 determining the relative position of the received target information block in the received service flow includes: counting information blocks in the received service flow by using a receiving counter; and determining the relative position of the received target information block in the received service flow, according to a value of the receiving counter.

In an embodiment, the service flow recovery module 2404 restoring the service flow according to the relative position and the position information carried in the target information block includes: determining a difference between the relative position of the target information block in the received service flow and a relative position of the target information block in a sent service flow, according to the relative position and the position information carried in the target information block; and restoring the service flow according to the difference.

In an embodiment, the service flow recovery module 2404 restoring the service flow according to the difference includes: performing reverse addition or deletion of idle information block in the received service flow, according to the difference, in response to determining the difference being within a preset range; and assigning the position information carried in the target information block to the receiving counter as a receiving counter value corresponding to the target information block, in response to determining the difference being beyond the preset range.

In an embodiment, the service flow recovery module 2404 determining the difference between the relative position of the target information block in the received service flow and the relative position of the target information block in the sent service flow includes: using the position information carried in the target information block received for a first time as an initial value of the receiving counter of the receiving end, and obtaining a difference between a receiving counter value corresponding to the received target information block and the position information carried in the target information block, as the difference between the relative position of the target information block in the received service flow and the relative position of the target information block in the sent service flow.

In an embodiment, the service flow recovery module 2404 restoring the service flow according to the relative position and the position information carried in the target information block includes: restoring the target information block to an idle information block, in response to the target information block being an O code block or a custom information block; and restoring the target information block to an original S block or T block, in response to the target information block being an S block or a T block.

In an embodiment, the position extracting module 2403 is further configured to: calculate a verification-check value according to the position information carried in the target information block; determine that the position information carried in the target information block is valid, in response to the verification-check value being identical to verification information carried in the target information block; and discard the position information carried in the target information block, in response to the verification-check value being different from the verification information carried in the target information block.

The above solutions are only examples of this application, and various specific implementations are possible. For example, other types of information blocks may be used to transfer position information.

It should be understood by those having ordinary skill in the art that the functional modules/units in all or some of the steps, systems, and devices in the method disclosed above may be implemented as software, firmware, hardware, or suitable combinations thereof. If implemented as hardware, the division between the functional modules/units stated above does not necessarily correspond to the division of physical components; for example, one physical component may have a plurality of functions, or one function or step may be performed through cooperation of several physical components. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). As well known by those having ordinary skill in the art, the term "computer storage media" includes volatile/nonvolatile and removable/non-removable media used in any method or technology for storing information (such as computer-readable instructions, data structures, program modules and other data). The computer storage media include, but are not limited to, RAM, ROM, EEPROM, flash memory or other memory techniques, CD-ROM, digital versatile disk (DVD) or other optical discs, magnetic cassette, magnetic tape, magnetic disk or other magnetic storage devices, or any other media which can be used to store the desired information and can be accessed by a computer. In addition, it is well known by those having ordinary skill in the art that the communication media generally include computer-readable instructions, data structures, program modules or other data in a modulated data signal, such as a carrier wave or other transmission mechanism, and may include any information delivery media.

Compared with a related technology, in at least one embodiment of the present application, when a service flow is sent, a relative position of an information block is carried in the service flow, so that clock information of the service flow is transmitted, and it is convenient for the receiving end to recover a clock of the service flow.

The invention claimed is:

1. A service sending method, comprising:

sending, by a sending end, a service flow, a target information block of the service flow carrying position information, and the position information being used for indicating a relative position of the target information block carrying the position information with respect to a starting information block in the service flow, wherein the position information is a value of a sending counter of the sending end, the sending counter is configured to sequentially count information blocks from the starting information block in the service flow and mark positional relationships between the information blocks, the relative position of the target information block carrying the position information with respect to the starting information block in the service flow is determined by a difference between the value of the sending counter corresponding to the target information block and the value of the sending counter corresponding to the starting information block, and the value of the sending counter is a sequence number.

2. The service sending method according to claim 1, wherein the target information block is at least one of an S block, a T block, an O code block, or a custom information block.

3. The service sending method according to claim 2, wherein the target information block is the S block or the T block, and before sending the service flow, the method further comprises: replacing partial byte content of the S block or T block in the service flow with the position information.

4. The service sending method according to claim 2, wherein the target information block is the O code block or the custom information block, and before sending the service flow, the method further comprises: replacing an idle information block in the service flow with the target information block.

5. The service sending method according to claim 1, wherein the target information block further carries verification information generated according to the position information.

6. A service sending device, comprising a memory and a processor, wherein the memory stores a program, and the program is to be read and executed by the processor to cause the processor to implement the method according to claim 1.

7. A non-transitory computer-readable storage medium storing at least one program, wherein the at least one program is to be executed by at least one processor to cause the at least one processor to implement the method according to claim 1.

8. A service sending method, comprising:

sending, by a sending end, a service flow, a target information block of the service flow carrying position information, and the position information being used for indicating a relative position of the target information block carrying the position information with respect to a starting information block in the service flow, wherein the position information is a value of a sending counter of the sending end, the sending counter is configured to sequentially count information blocks from the starting information block in the service flow, and the value of the sending counter is a sequence number, wherein the target information block is an S block or a T block, and before sending the service flow, the method further comprises:

replacing partial byte content of the S block or T block in the service flow with the position information.

9. A service sending method, comprising:

sending, by a sending end, a service flow, a target information block of the service flow carrying position information, and the position information being used for indicating a relative position of the target information block carrying the position information with respect to a starting information block in the service flow, wherein the position information is a value of a sending counter of the sending end, the sending counter is configured to sequentially count information blocks from the starting information block in the service flow, and the value of the sending counter is a sequence number, wherein the target information block further carries verification information generated according to the position information.

* * * * *